United States Patent [19]

Howseman, Jr.

[11] Patent Number: 5,072,252
[45] Date of Patent: Dec. 10, 1991

[54] FIBER OPTIC BOOK COPIER

[76] Inventor: William E. Howseman, Jr., 150 E. Los Angeles Ave. #205, Moorpark, Calif. 93021

[21] Appl. No.: 599,749

[22] Filed: Oct. 19, 1990

[51] Int. Cl.⁵ .................. G03B 27/32; G03B 27/52
[52] U.S. Cl. .................................. 355/1; 355/25; 355/75; 355/82
[58] Field of Search .................. 355/1, 25, 82, 75

[56] References Cited

U.S. PATENT DOCUMENTS 3,630,612 12/1971 Lehovec ..................... 355/25 X

FOREIGN PATENT DOCUMENTS 186830 9/1985 Japan ............................ 355/1

Primary Examiner—Richard A. Wintercorn
Attorney, Agent, or Firm—Linval B. Castle

[57] ABSTRACT

Full pages of books may be photocopied without damage to the book bindings by placing the open book on a wedge of fiber optics perpendicularly aligned to the copier platen to optically couple the photocopier to the book pages.

6 Claims, 1 Drawing Sheet

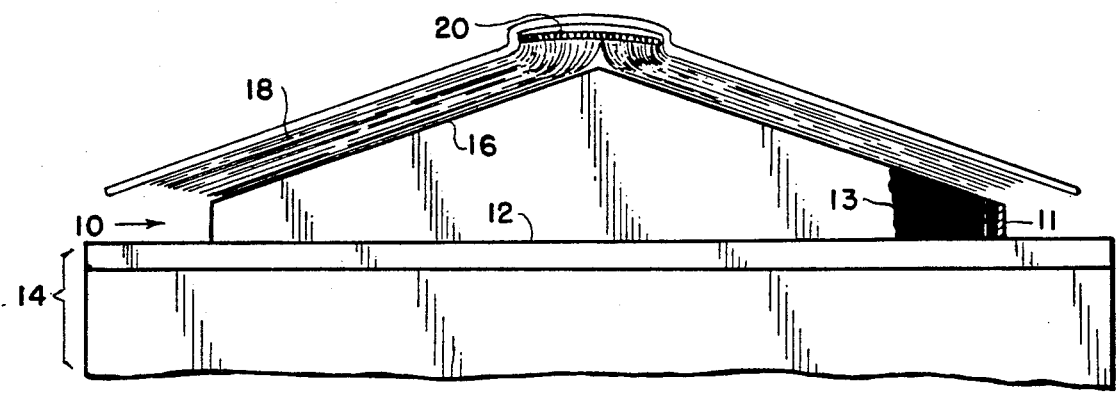
FIG. 1
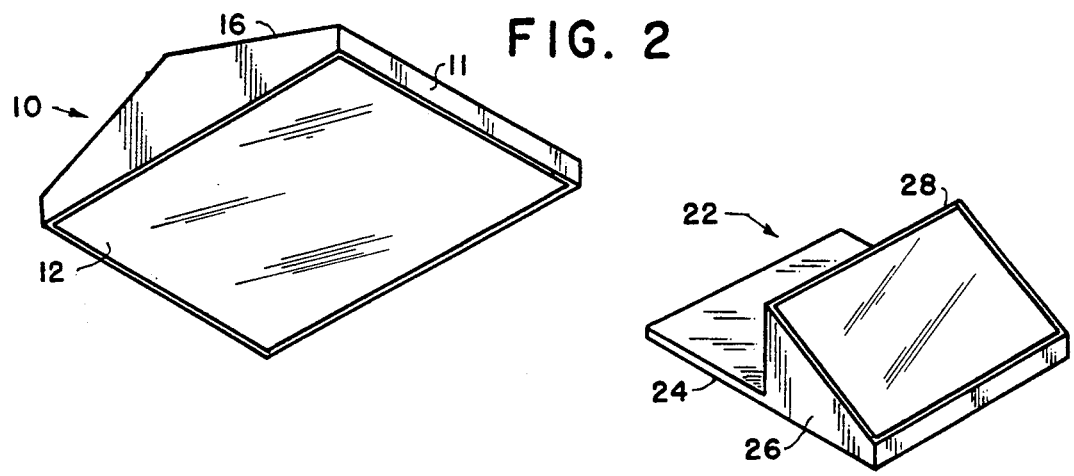
FIG. 2
FIG. 3
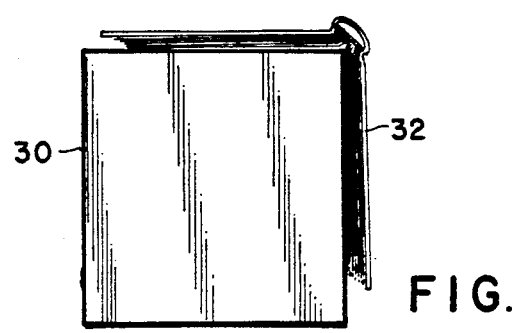
FIG. 4

5,072,252

FIBER OPTIC BOOK COPIER

BRIEF SUMMARY OF THE INVENTION

This invention relates generally to document copiers and in particularly to an accessory that may be used with a conventional document copier for copying pages from bound books without danger of damaging the bindings.

Copying pages from a bound volume is usually accomplished by placing the book, opened to the page to be copied, face down on the surface of the glass platen of a xerographic copier and pressing the book binding tightly against the glass to get a copy of the full page. This, of course, stresses the book binding and often causes permanent damage to it. This problem has been recognized in the past and many attempts have been made to provide copiers that can reproduce pages from a partially open book to thereby eliminate the stresses on the binding. U.S. Pat. No. 2,511,102, 3,224,352, 3,712,729, and 3,635,557 are good examples of book copiers in which a partially open book is mounted on a wedge shaped glass and the displayed pages are photographically reproduced by various methods, some requiring photo cameras or by use of reflex copy paper. All prior systems are capable of copying pages from bound volumes without damaging the binding, but these prior systems require photoprocessing and long processing times required are unacceptable to modern businesses.

The book copier to be described operates in conjunction with a xerographic type copier and therefore is capable of producing high speed, finished copies of a book page. The copier may be a separate unit used by placing the book copier on the glass platen of an existing photocopiers or may be an integral component part of a photocopier constructed especially for copying pages or documents from bound volumes.

Briefly described, the book copier to be described includes a large fiber optic bundle between the partially opened book to be copied and the platen of a commercial type copier. The fiber optic bundle will usually be wedge shaped for copying both pages of a book placed on the fiber optic wedge, but may be a "half-wedge" or rectangular block for copying a single page from the book. By thus copying directly on a fast commercial copier, the copy is nearly instantly available.

BRIEF DESCRIPTION OF THE DRAWINGS

In the drawings which illustrate the preferred embodiment of the invention:

FIG. 1 is an elevational view of a fiber optic book copier positioned on a xerographic copier;

FIG. 2 is a perspective view of the book copier of FIG. 1;

FIG. 3 is a perspective view of a "half wedge" fiber optic bundle for copying single page of books; and FIG. 4 is side elevational view of a rectilinear fiber optic bundle for copying single pages of books.

DETAILED DESCRIPTION

The book copier may operate with a commercially available copier such as a xerographic copier or may be made as a component part of such a copier. In either case, the book copier includes thousands of closely packed, parallel optical fibers with their lower ends aligned parallel with a plane of a copier platen and extending to a second plane in contact with a page of a book to be copied, as shown in FIG. 1. The fibers are preferably straight, as shown, but may be bent so that they terminate at right angles to an angled plane forming part of a wedge.

FIG. 1 is an elevational view of a book copier 10, the base 12 of which is resting on the glass platen of a commercial copier 14. Book copier 10 preferably has a strong metal or plastic exterior housing 11 containing thousands of closely spaced, parallel optical fibers aligned perpendicular to the base 12, as shown in the sectioned portion 13 in the drawing. The fiber density within the housing 11 may be in the order of three hundred per inch making a total of about 24,000 fibers in an eight by ten inch base, adequate for copying both pages of an open book. The book copier 10 has no top housing and is formed as a wedge 16 with a roof pitch angle of about 20°. At this angle, a book 18 placed on the wedge 16 will remain open to expose both pages without danger of damaging the book binding 20. In operation, the strong light emitted by the copier 14 passes vertically through the fiber optics within the housing 11 and through the fibers ends at the wedge 16 to reflect the images on the exposed pages of the book 18. Because of the high fiber density in the book copier 10, the printed image from the copier 14 will appear as a fine, very readable halftone.

FIG. 2 illustrates the book copier 10 of FIG. 1 in perspective and shows the open floor of the housing 11, The rectangular portion of the base 12 within the outer frame of the housing 11 is the smooth ends of all the optical fibers.

At the present time, optical fibers are relatively costly and the total cost of producing an 8×10 inch book copier with its 24,000 optical fibers may be prohibitive to many. A book copier for copying only a single page of an open book requires only half the fibers and is illustrated in FIGS. 3 and 4.

FIG. 3 illustrates a half-book copier 22 comprising one-half of the book copier 10 of FIG. 1. For stability on a photocopier platen, the copier 22 should have a full size base 24, similar to the base 12 of FIG. 1, but only requires half the optical fibers in a slanted top frame 26. A book, opened to the page to be reproduced, is placed over the wedge 28 formed by the slanted top frame 26 and the optic fibers packed within the frame will transmit light from the photocopier to the book page and return to copy the page.

FIG. 4 illustrates a rectilinear book copier 30 in which several thousand fibers of equal length and corresponding at least to the width of a book cover are packed together into a rectangular block. The fibers are vertically aligned to transmit light between the photocopier that supports the book copier 30 and a book 32 opened to the page to be copied. While the fibers in the book copier 30 are preferably tightly bound in a housing surrounding the sides of the a rectangular block, the tightly packed optical fibers may be cast together in a plastic block.

I claim:

1. A book flat page copying accessory for use with a photocopier having a flat glass platen, said book page copying accessory comptiring:

a bundle of parallel optical fibers having first and second ends, the first ends of said fibers aligned to form a first plane perpendicular to said fibers for positioning on the flat glass platen of a photocopier, said second end of said fibers being aligned in at least one page size plane for contacting a page of the book.

2. The book flat page copying accessory claimed in claim 1 wherein said bundle of optical fibers is rectangular in cross section to form rectangular first and second planes.

3. The book flat page copying accessory claimed in claim 2 wherein said bundle is bound, together within a housing confining the sides of said bundle and unaffecting first and second planes thereof.

4. The book flat page copying accessory claimed in claim 3 wherein the fibers in said bundle are a density of approximately 300 fibers per linear inch.

5. The book flat page copying accessory claimed in claim 2 wherein said second ends of said optical fibers terminate in two planes connected together along an edge and angled with respect to each other to form a wedge shape for supporting an open book.

6. The book flat page copying accessory claimed in claim 2 wherein said first and second planes of said accessory are substantially parallel.

* * * * *